(12) United States Patent
Grizzle et al.

(10) Patent No.: US 6,336,071 B2
(45) Date of Patent: Jan. 1, 2002

(54) DIRECT INJECTION ENGINE SYSTEM AND METHOD

(75) Inventors: Jessy W. Grizzle, Ann Arbor; Jing Sun, Bloomfield, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/824,409

(22) Filed: Apr. 2, 2001

Related U.S. Application Data

(62) Division of application No. 09/419,754, filed on Oct. 18, 1999.

(51) Int. Cl.$^7$ .................................................. G06F 19/00
(52) U.S. Cl. ..................................... 701/115; 123/481
(58) Field of Search .................................. 701/104, 109, 701/115; 123/481, 198 T

(56) References Cited

U.S. PATENT DOCUMENTS

| | | | | | |
|---|---|---|---|---|---|
| 5,884,210 A | * | 3/1999 | Retting et al. | ............... | 701/115 |
| 5,884,211 A | * | 3/1999 | Pauli et al. | ................... | 701/115 |
| 6,009,372 A | * | 12/1999 | Baker et al. | .................. | 701/115 |
| 6,032,646 A | * | 3/2000 | Minowa et al. | .............. | 701/115 |
| 6,076,037 A | * | 6/2000 | Ono et al. | .................... | 701/115 |

* cited by examiner

*Primary Examiner*—John Kwon
(74) *Attorney, Agent, or Firm*—John D. Russell; Julia Voutyras

(57) ABSTRACT

A method for controlling mode transitions, such as from stratified to homogeneous mode, in a direct injection engine adjusts a number of cylinders carrying out combustion to prevent engine torque disturbances. Cylinder activation is used when changes in cylinder air/fuel ratio cannot be compensated using ignition timing adjustments. In addition, the number of cylinders to activate is also determined and measures are taken if the number of cylinders determined are not available to be activated.

1 Claim, 3 Drawing Sheets

DIRECT INJECTION ENGINE SYSTEM AND METHOD

This application is a divisional application of U.S. Ser. No. 09/419,754, filed Oct. 18, 1999.

FIELD OF THE INVENTION

This invention relates to mode transition control of a direct injection spark ignition engine.

BACKGROUND OF THE INVENTION

In direct injection spark ignition engines, the engine operates with stratified air/fuel operation in which the combustion chamber contains stratified layers of different air/fuel mixtures. The strata closest to the spark plug contains a stoichiometric mixture or a mixture slightly rich of stoichiometry, and subsequent strata contain progressively leaner mixtures.

The engine may also operate in a homogeneous mode of operation with a homogeneous mixture of air and fuel generated in the combustion chamber by early injection of fuel into the combustion chamber during the intake stroke. Homogeneous operation may be either lean of stoichiometry, at stoichiometry, or rich of stoichiometry.

Direct injection engines are also coupled to conventional three-way catalytic converters to reduce CO, HC, and NOx. When operating at air/fuel mixtures lean of stoichiometry, a NOx trap or catalyst is typically coupled downstream of the three-way catalytic converter to further reduce NOx.

The stratified mode of operation is typically utilized when the engine is operating in light to medium loads. The homogeneous mode of operation is typically used from medium to heavy load operating conditions. In certain conditions, it is necessary to transition from one engine mode of operation to the other. During these mode transitions, it is desired to deliver the requested engine output torque to provide good drive feel. However, in some circumstances, the range of acceptable lean air/fuel ratios of stratified operation do not overlap with the acceptable air/fuel ratios of homogeneous operation. Therefore, during the mode transition, a torque shock occurs because of the step change in engine air/fuel ratio.

One method of preventing the engine torque disturbance during mode transition is to change the injection mode one cylinder at a time according to the required amount of fuel to be injected. This reduces a large torque disturbance to several smaller torque disturbances. Such a method is described in U.S. Pat. No. 5,170,759.

The inventors herein have recognized a disadvantage with the above approach. Even though the large torque jump during mode transition is avoided, there are still several smaller torque jumps experienced. In other words, a single, large torque disturbance is substituted with multiple smaller torque disturbances which are still noticeable by the vehicle driver.

SUMMARY OF THE INVENTION

An object of the invention herein is to control an engine during mode transitions to provide a smooth torque output.

The above object is achieved and disadvantages of prior approaches overcome by a method for controlling an engine during a cylinder air/fuel ratio change from a first cylinder air/fuel ratio to a second cylinder air/fuel ratio. The method comprising the steps of determining a first number of cylinders to enable to perform combustion so that the cylinder air/fuel ratio change can occur without a disturbance in engine torque, enabling said first number of cylinders and changing the cylinder air/fuel from the first cylinder air/fuel ratio to the second cylinder air/fuel ratio when said number of cylinders are currently disabled, and disabling a second number of cylinders and changing the cylinder air/fuel ratio from the first cylinder air/fuel ratio to a third cylinder air/fuel ratio otherwise.

By using cylinder activation as an additional degree of freedom, abrupt changes in average engine torque can be avoided even during air/fuel ratio changes. Thus, during a mode transition where engine air/fuel ratio is constrained to change due to, for example, combustion limits, abrupt changes in average engine torque can be avoided by changing a number of active cylinders. Also, a check is made as to whether the required number of cylinders to activate are currently deactivated.

An advantage of the above aspect of the invention is that abrupt changes in engine output torque can be avoided during mode transitions.

Another advantage of the above aspect of the invention is that the range of stratified operation can be extended since the range of available transitions is increased.

Yet another advantage of the above aspect of the invention is that emissions can be reduced since the engine can be operated farther from air/fuel ratio combustion limits.

In another aspect of the invention, the above object is achieved by a method for controlling an engine during a mode transition from homogeneous operation to stratified operation, wherein a cylinder air/fuel ratio changes from a first cylinder air/fuel ratio to a second cylinder air/fuel ratio. The method comprising the steps of determining a first number of cylinders to enable to perform combustion so that the cylinder air/fuel ratio change can occur without a disturbance in engine torque, enabling said first number of cylinders and changing the operating mode from homogeneous mode to stratified mode when said number of cylinders are currently disabled, said enabling step further comprising changing cylinder air/fuel from the first cylinder air/fuel ratio to the second cylinder air/fuel ratio, and disabling a second number of cylinders and changing the cylinder air/fuel ratio from the first cylinder air/fuel ratio to a third homogeneous cylinder air/fuel ratio otherwise.

By disabling cylinders when it is determined that cylinder activation is required yet there are insufficient cylinders to activate, it is possible to perform mode transitions using cylinder activation.

An advantage of the above aspect of the invention is that abrupt changes in engine output torque can be avoided during mode transitions.

Another advantage of the above aspect of the invention is that the range of stratified operation can be extended since the range of available transitions is increased.

Yet another advantage of the above aspect of the invention is that emissions can be reduced since the engine can be operated farther from air/fuel ratio combustion limits.

DESCRIPTION OF THE DRAWINGS

The object and advantages of the invention claimed herein will be more readily understood by reading an example of an embodiment in which the invention is used to advantage with reference to the following drawings wherein:

DESCRIPTION OF AN EXAMPLE OF OPERATION

Figure 1:
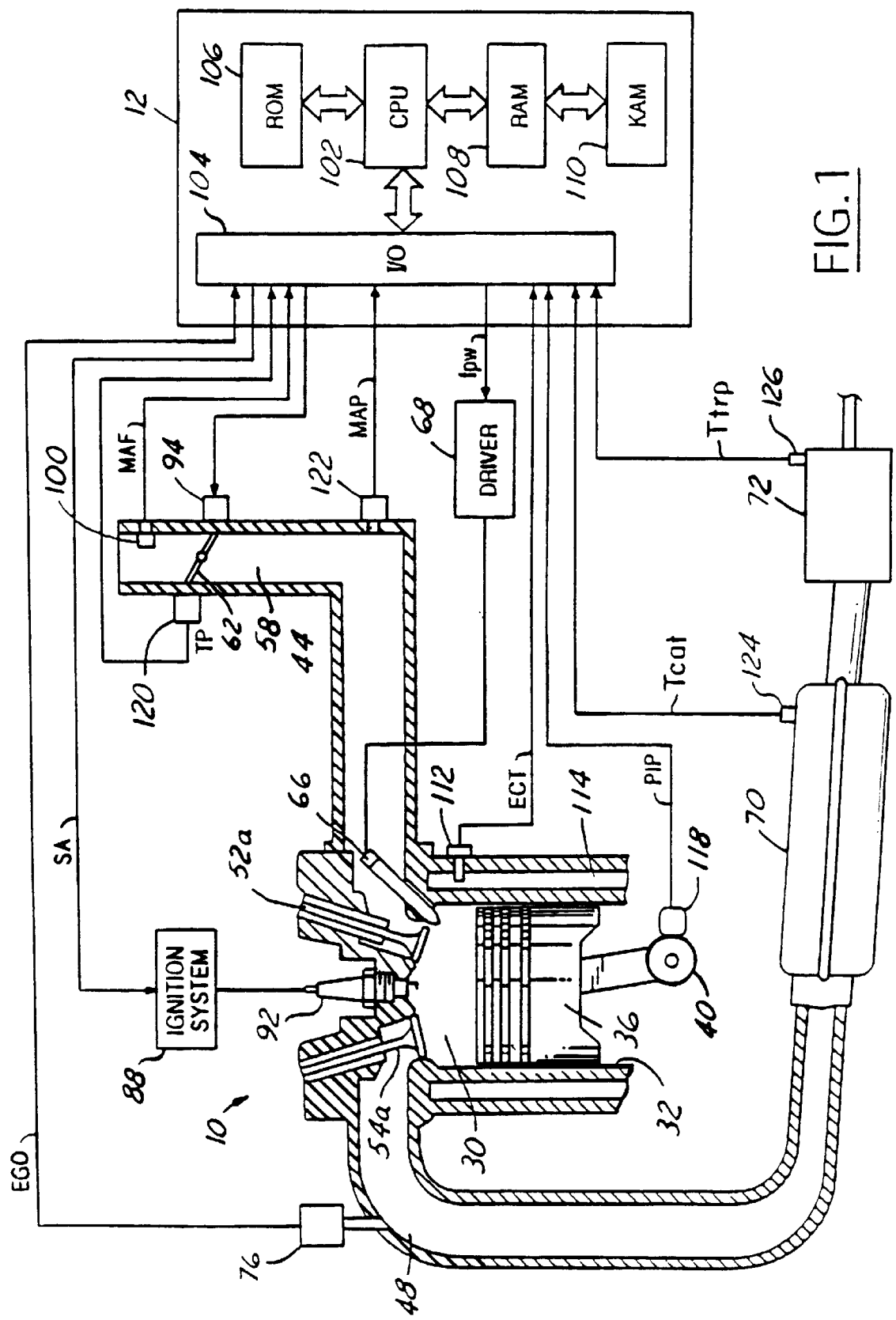
FIG. 1 is a block diagram of an embodiment in which the invention is used to advantage.

Direct injection spark ignited internal combustion engine 10, comprising a plurality of combustion chambers, is controlled by electronic engine controller 12. Combustion chamber 30 of engine 10 is shown in FIG. 1 including combustion chamber walls 32 with piston 36 positioned therein and connected to crankshaft 40. In this particular example piston 36 includes a recess or bowl (not shown) to help in forming stratified charges of air and fuel. Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel injector 66 by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC) which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas oxygen sensor 76 is shown coupled to exhaust manifold 48 upstream of catalytic converter 70. In this particular example, sensor 76 provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66 during the engine compression stroke so that fuel is sprayed directly into the bowl of piston 36. Stratified air/fuel layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 66 during the intake stroke so that a substantially homogeneous air/fuel mixture is formed when ignition power is supplied to spark plug 92 by ignition system 88. Controller 12 controls the amount of fuel delivered by fuel injector 66 so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30.

Nitrogen oxide (NOx) absorbent or trap 72 is shown positioned downstream of catalytic converter 70. NOx trap 72 absorbs NOx when engine 10 is operating lean of stoichiometry. The absorbed NOx is subsequently reacted with HC and catalyzed during a NOx purge cycle when controller 12 causes engine 10 to operate in either a rich homogeneous mode or a stoichiometric homogeneous mode.

Controller 12 is shown in FIG. 1 as a conventional microcomputer including: microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

In this particular example, temperature Tcat of catalytic converter 70 and temperature Ttrap of NOx trap 72 are inferred from engine operation as disclosed in U.S. Pat. No. 5,414,994 the specification of which is incorporated herein by reference. In an alternate embodiment, temperature Tcat is provided by temperature sensor 124 and temperature Ttrap is provided by temperature sensor 126.

Figure 2:
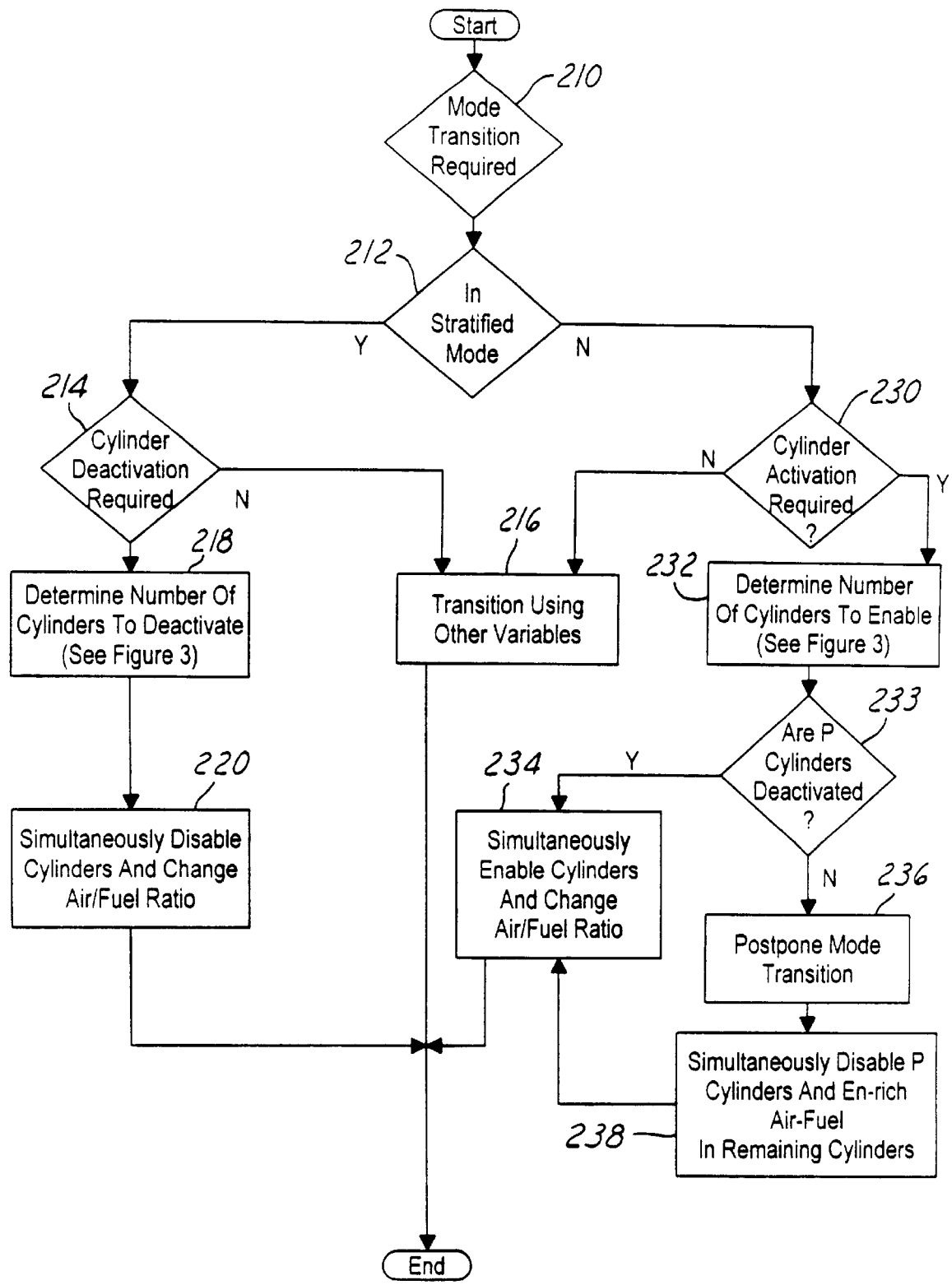
FIGS. 2–3 are high level flowcharts which perform a portion of operation of the embodiment shown in FIG. 1.

Referring now to FIG. 2 a routine for performing mode transitions from stratified to homogeneous, and from homogeneous to stratified is described. First, a determination is made in step 210 if a mode transition is required. A mode transition is required based on engine operating conditions. For example, as the required engine torque is gradually decreased from a large value to a small value, a transition from homogeneous mode of operation to stratified mode may be required. Conversely, if the required engine torque is gradually changed from a low value to a high value, transition from stratified mode to homogeneous mode may be required. Also, fuel economy requirements or emission device conditions may dictate mode transitions. For example, when trap 72 is reaches a certain capacity of stored NOx, a transition may be required from stratified mode to homogeneous mode so that a rich or stoichiometric air/fuel ratio can be combusted, thereby allowing purging of trap 72. Further, this transition is required to be smooth so that driver comfort is not affected.

Continuing with FIG. 2, if the answer to step 210 is yes, a determination is made in step 212 if the engine is currently operating in the stratified mode. If the answer to step 212 is yes, a new determination is made in step 214 if cylinder deactivation is required. The determination in step 214 is made using engine mapping data described by the following equation:

$$\min_{spark} T^i(spark, a/f_{max}^{homogeneous}) > \max_{spark} T^i(spark, a/f_{min}^{stratified})$$

where the equation determines if the minimum indicated engine torque ($T^i$) over available ignition timings (spark) for homogenous operation at the maximum lean homogenous air/fuel ratio $$(a/f_{\max}^{homogeneous})$$

is greater than the maximum indicated engine torque over available ignition timings for stratified operation at the minimum lean stratified air/fuel ratio $$(a/f_{\max}^{homogeneous})$$

at the current operating conditions define by, for example, engine speed (RPM), fresh air flow, exhaust gas recirculation amount, and any other variables known to those skilled in the art to affect engine indicated torque. In other words, if this condition is true, then a torque disturbance will occur when transitioning from stratified to homogenous mode if only ignition timing is used to compensate for the mode change. Also, these torque calculations are scaled for the current number of active cylinders (Ncyl). Thus, one of ordinary skill in the art will recognize the general applicability of the present invention to any number of cylinders including when some cylinders may be deactivated.

When this condition holds, cylinder deactivation is used. If cylinder deactivation is not used, a mode transition can be carried out using other control variables such as spark timing in step 216. Otherwise, in step 218, the number of cylinders to deactivate is determined. The number of cylinders to deactivate is based on the size of the torque gap and several other factors, as described later herein with particular reference to FIG. 3. Next, in step 220, the determined number of cylinders are deactivated while at the same time the operating mode of the remaining cylinders is changed. In addition, during the mode change, the air/fuel ratio is also abruptly changed. However, according to the present invention, the average output torque of the engine avoids abrupt changes.

Continuing with FIG. 2, if the answer to step 212 is no, then the engine is currently operating in the homogeneous mode and a transition from the homogeneous mode to the stratified mode is required. In step 230, a determination is made if cylinder reactivation is required based on the following equation:

$$\min_{spark} T^i(spark, a/f_{\max}^{homogeneous}) < \max_{spark} T^i(spark, a/f_{\min}^{stratified})$$

If the answer to step 230 is no, the routine continues to step 216 previously described herein. Otherwise, in step 232, the number of cylinders to enable is determined as described later herein with particular reference to FIG. 3. Next, in step 233, a determination is made as to whether the required number of cylinders to enable (P) are currently deactivated. In other words, it is not possible to enable cylinders if there are currently no cylinders deactivated. When the answer to step 233 is Y, then, in step 234, the determined cylinders are enabled and the engine operating mode is simultaneously changed from the homogeneous mode to the stratified mode. In addition, during this transition, the air/fuel ratio in the cylinders is jumped.

When the answer to step 233 is NO, the mode transition is postponed until there are (P) cylinders disabled in step 236. Then, in step 238, (P) cylinders are disabled and the remaining cylinders continuing to carry out combustion are enriched. In other words, the air/fuel ratio of the cylinder continuing to carry about combustion is decreased by changing the fuel injection amount to those cylinders at the same time fuel injection is stopped to the (P) cylinders to be deactivated. The new air/fuel ratio for the remaining cylinders is found as described by the following equation:

$$\left(\frac{air}{fuel}\right)_{new} = \left(\frac{N_{cyl}-(P-V)}{N_{cyl}}\right)\left(\frac{air}{fuel}\right)_{current}$$

where V is the current number of cylinder deactivated. The routine can then return to step 234 and enable the disabled cylinders and change operating mode from homogeneous to stratified.

Figure 3:
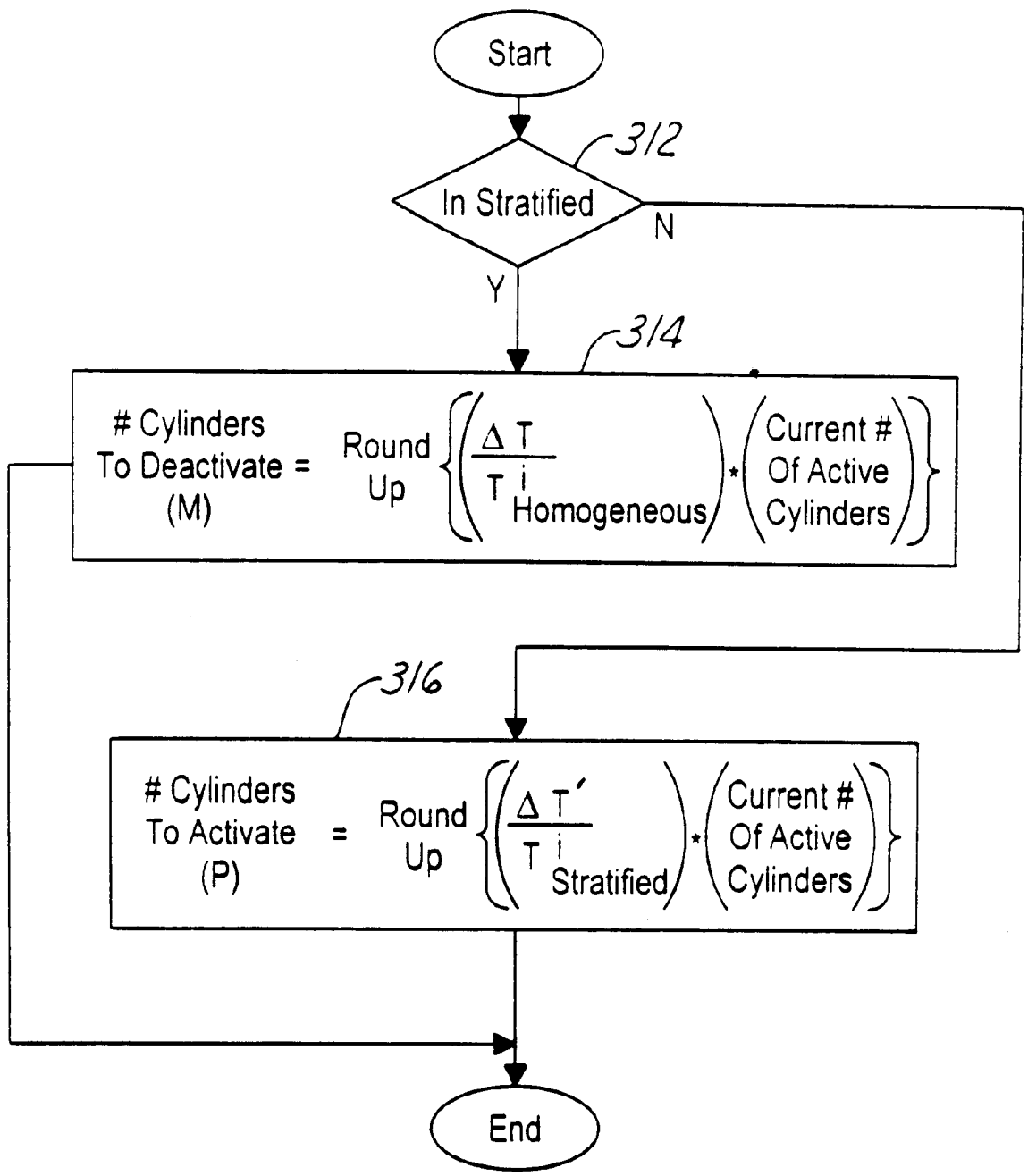

Referring now to FIG. 3, a routine for determining the number of cylinders to enable/disable is described. In step 312 a determination is made if the engine is currently operating in the stratified mode. If the answer to step 312 is yes, the number of cylinders to deactivate (M) is determined in step 314 from the following equations, where:

$$\Delta T = \min_{spark} T^i(spark, a/f_{\max}^{homogeneous}) - T_{requested}$$

$$M = roundup\left[\frac{\Delta T}{\min_{spark} T^i(spark, a/f_{\max}^{homogeneous})} N_{cyl}\right]$$

Again, these torque calculations are scaled for the current number of active cylinders (Ncyl). Thus, one of ordinary skill in the art will recognize the general applicability of the present invention to any number of cylinders including when some cylinders may already be deactivated.

If the answer to step 312 is no, the number of cylinders to activate (P) is determined in step 316 from the following equation, where:

$$\Delta T' = T_{requested} - \max_{spark} T^i(spark, a/f_{\min}^{stratified})$$

$$P = roundup\left[\frac{\Delta T'}{\max_{spark} T^i(spark, a/f_{\min}^{stratified})} N_{cyl}\right]$$

Thus, according to the present invention, during the mode transition, where the air/fuel ratio is discontinuously jumped due to engine performance constraints, abrupt changes in engine torque are avoided by either activating, or deactivating, cylinders concurrently with the air/fuel ratio jump.

Also, the "round up" function is used since the number of cylinders to activate or deactivate to compensate the engine torque during cylinder air/fuel ratio changes may not be exactly equal to an integer value. Therefore, the remaining torque difference can be compensated using methods known to those skilled in the art, such as ignition timing.

In an alternative embodiment, the torque difference can be calculated according to the formula:

$$\Delta T = \Delta T'$$
$$= |\min_{spark} T^i(spark, a/f_{\max}^{homogeneous}) - \max_{spark} T^i(spark, a/f_{\min}^{stratified})|.$$

In another an alternative embodiment, where cylinder air/fuel ratio is abruptly changed for reasons other than mode transitions, the method described above with particular reference to FIGS. 2–3 can be applied. In particular, increases or decreases in engine torque can be used for selecting either enabling, or disabling cylinders. For example, when an increase in engine torque will be produced (current engine torque is less than the future engine torque, equivalent to switching from stratified to homogenous mode), cylinder deactivation can be used. Similarly, when a decrease in engine torque will be produced (current engine torque is greater than the future engine torque, equivalent to switching from homogenous to stratified mode), cylinder activation can be used. The corresponding current and future engine torques and air/fuel ratios can be substituted into the above equations.

While the invention has been shown and described in its preferred embodiments, it will be clear to those skilled in the arts to which it pertains that many changes and modifications may be made thereto without departing from the scope of the invention. Accordingly, it is intended that the scope of the invention be limited only by the following claims.

We claim:

1. An article of manufacture comprising:

a computer storage medium having a computer program encoded therein for controlling an engine during a cylinder air/fuel ratio change from a first cylinder air/fuel ratio to a second cylinder air/fuel ratio, said computer storage medium comprising:

code for determining a first number of cylinders to enable to perform combustion so that the cylinder air/fuel ratio change can occur without a disturbance in engine torque;

code for enabling said first number of cylinders and changing the cylinder air/fuel from the first cylinder air/fuel ratio to the second cylinder air/fuel ratio when said number of cylinders are currently disabled;

code for disabling a second number of cylinders and changing the cylinder air/fuel ratio from the first cylinder air/fuel ratio to a third cylinder air/fuel ratio otherwise; and code for performing said enabling code after performing said disabling code.

* * * * *